United States Patent [19]

Osaki et al.

[11] Patent Number: 5,489,115
[45] Date of Patent: Feb. 6, 1996

[54] ACTIVE SUSPENSION SYSTEM

[75] Inventors: Seiji Osaki; Nobuharu Kuriki; Hideaki Shibue; Yoshiki Noro, all of Saitama, Japan

[73] Assignee: Honda Giken Kogyo Kabushiki Kaisha, Tokyo, Japan

[21] Appl. No.: 717,625

[22] Filed: Jun. 19, 1991

[30] Foreign Application Priority Data

Aug. 6, 1990 [JP] Japan ............................ 2-208350

[51] Int. Cl.⁶ ............................................ B60G 17/015
[52] U.S. Cl. .............................. 280/707; 364/424.05
[58] Field of Search ............................ 280/707, 709; 364/424.05

[56] References Cited

U.S. PATENT DOCUMENTS

| | | | |
|---|---|---|---|
| 4,625,993 | 12/1986 | Williams et al. | 280/707 |
| 4,685,698 | 8/1987 | Klinkner et al. | 280/707 |
| 4,787,649 | 11/1988 | Watanabe et al. | 280/707 |
| 4,887,699 | 12/1989 | Ivers et al. | 280/707 |
| 4,981,309 | 1/1991 | Froeschle et al. | 280/707 |
| 4,999,777 | 3/1991 | Schussler et al. | 280/707 |

FOREIGN PATENT DOCUMENTS 0046909  2/1988  Japan ............................ 280/707

*Primary Examiner*—Margaret A. Focarino
*Assistant Examiner*—Paul Dickson
*Attorney, Agent, or Firm*—Weiner, Carrier & Burt; Joseph P. Carrier; Irving M. Weiner

[57] ABSTRACT

In a vehicle suspension system including a hydraulic actuator between a sprung mass consisting substantially of a vehicle body and an unsprung mass consisting substantially of a wheel, a force proportional to but opposite in phase to an inertia force acting on the unsprung mass is applied by the actuator to the unsprung mass so that the ability of the tire to maintain contact with the road surface may be improved. This produces very little effect on the behavior of the sprung mass, but the vehicle handling is significantly improved. Better contact with the road surface not only improves the vehicle handling but also reduces the consumption of energy by the hydraulic actuator. A particularly favorable result can be obtained when the hydraulic actuator further applies a damping force proportional to the absolute velocity of the sprung mass to the sprung mass.

5 Claims, 8 Drawing Sheets

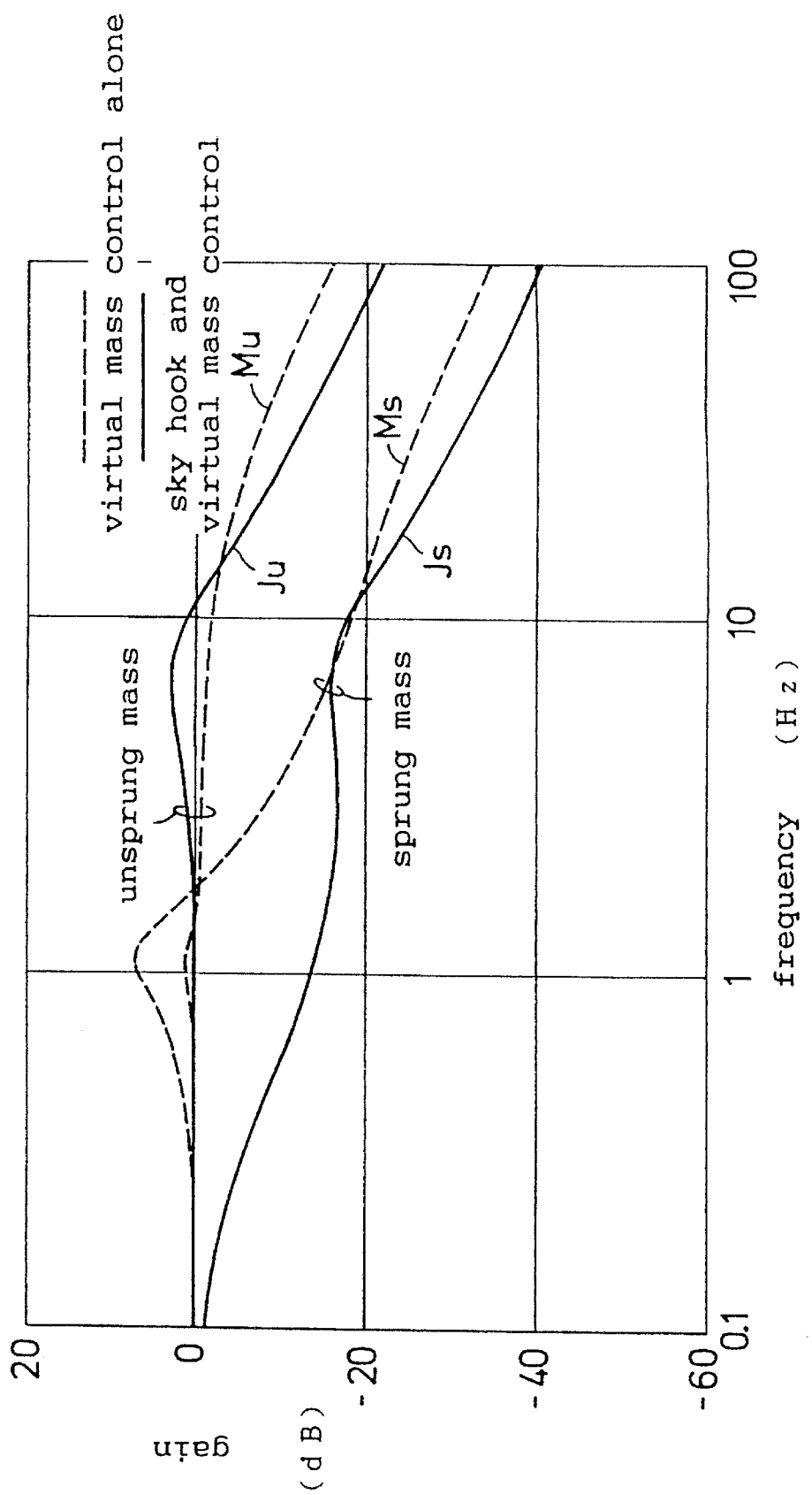

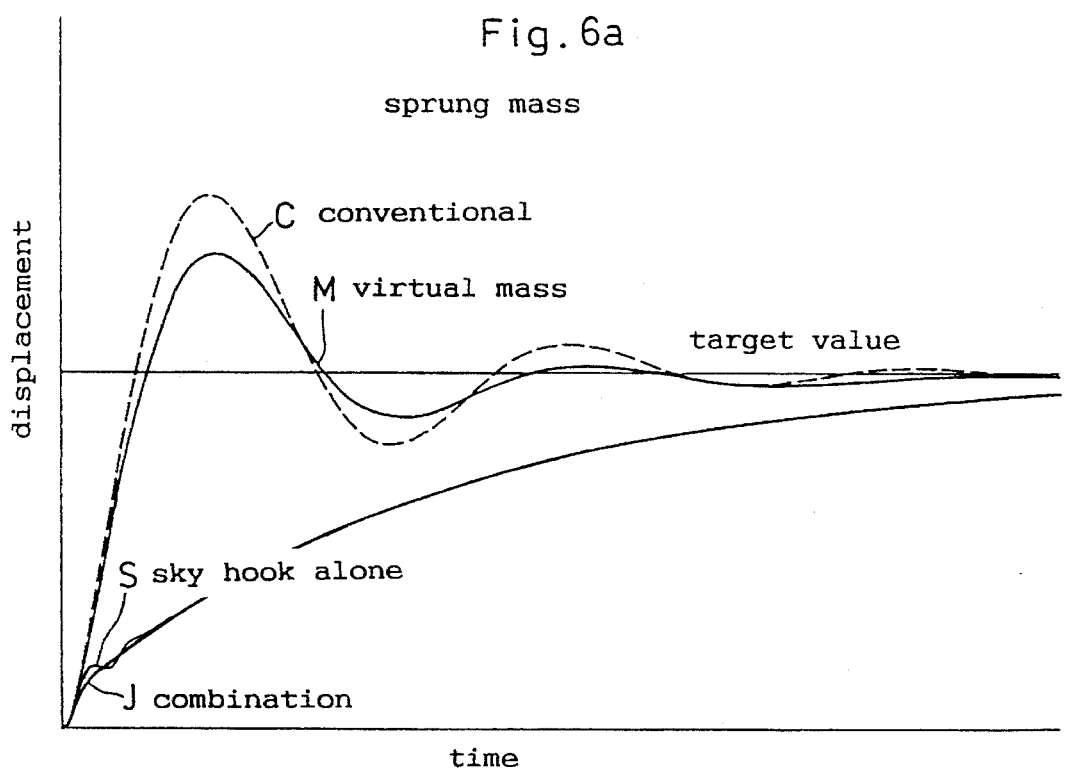
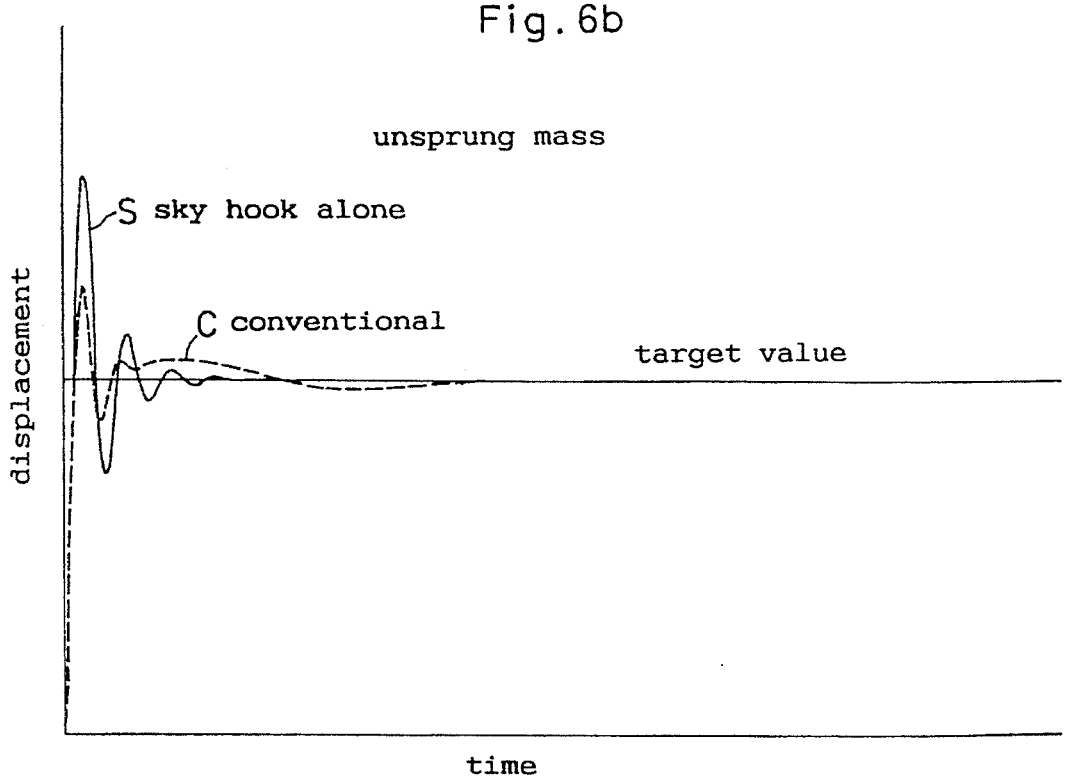

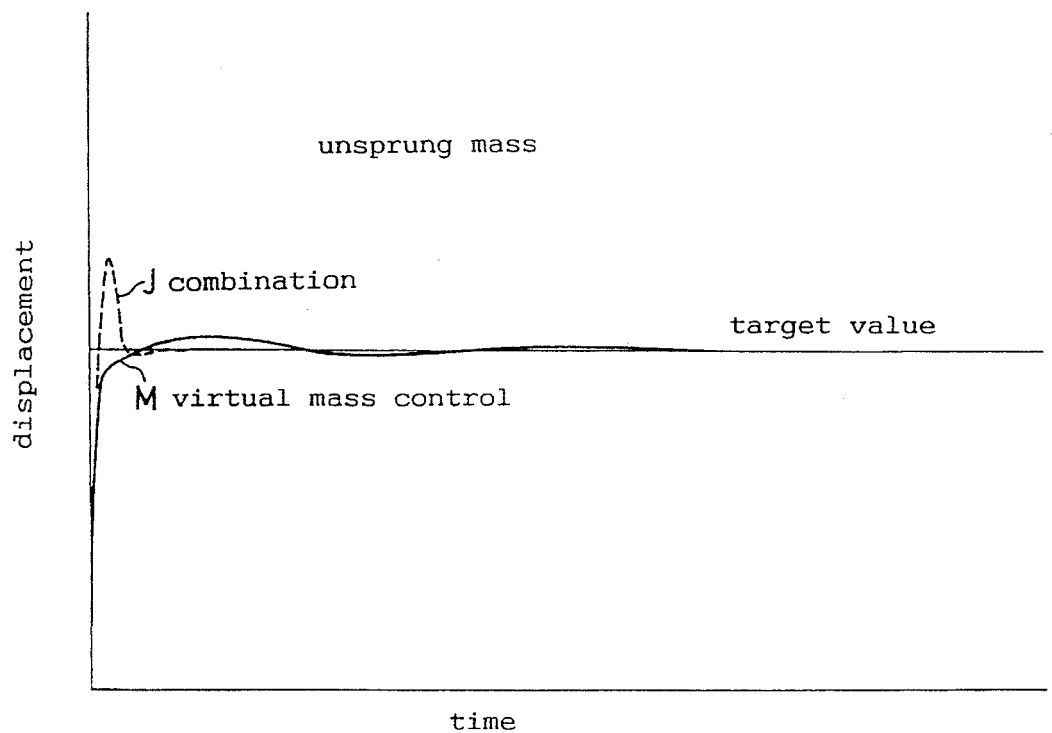

ACTIVE SUSPENSION SYSTEM

TECHNICAL FIELD

The present invention relates to an active suspension system and a control method for the same, and in particular to an active suspension system and a control method for the same employing a hydraulic actuator disposed between a wheel and a vehicle body and adapted to be actively controlled.

BACKGROUND OF THE INVENTION

There have been proposed a number of active suspension systems in which the vertical relative displacement between a wheel and a vehicle body is controlled by using an actively controlled actuator according to the conditions of the road surface and the vehicle motion. According to such an active suspension system, a force proportional to the displacement corresponding to a spring force, and a force proportional to the rate of the displacement corresponding to a damping force can be freely generated with an hydraulic actuator according to the behavior of the vehicle body and the motion of the wheels, and it is possible to obtain both a favorable ride and a stable maneuverability.

Normally, the unsprung mass of a vehicle which typically consists of a wheel carrier, a wheel carried thereby, a tire, and associated brake and other power transmission elements has a resonance frequency of approximately 10 Hz, and the tire tends to lose its ability to maintain its contact with the road surface in this frequency range. However, the conventional control method for active suspension systems which merely replaces the forces generated by a spring and a damper with a force generated by an hydraulic actuator is unable to reduce the large oscillation amplitude of the unsprung mass in this frequency range, and it therefore makes little or no contribution in improving the ability of the tire to maintain its contact with the road surface in the frequency range around 10 Hz.

BRIEF SUMMARY OF THE INVENTION

In view of such problems of the prior art, a primary object of the present invention is to provide a vehicle suspension system and a control method for the same which are capable of controlling the vibration transmissibility ratio from the road surface of the unsprung mass in the resonance frequency range of the unsprung mass.

A second object of the present invention is to provide a vehicle suspension system and a control method for the same which can improve the ability of the tire to maintain its contact with the road surface.

These and other objects of the present invention can be accomplished by providing a method for controlling a vehicle suspension system including a hydraulic actuator between a sprung mass consisting substantially of a vehicle body and an unsprung mass consisting substantially of a wheel and parts associated therewith, wherein: an output of the actuator is determined so as to apply a force to the wheel which is substantially in proportion to an inertia force of the unsprung mass: and a vehicle suspension system, comprising: spring and damper means interposed between a sprung mass consisting substantially of a vehicle body and an unsprung mass consisting substantially of a wheel and parts associated therewith; a hydraulic actuator interposed between the spring mass and the unsprung mass in parallel with the spring and damper means; an acceleration sensor mounted on the unsprung mass; a control unit for controlling the actuator so as to apply a force to the unsprung mass which is substantially in proportion to and opposite in phase to an inertia force of the unsprung mass.

In this way, the inertia force generated by the motion of the unsprung mass can be cancelled by the force generated by the hydraulic actuator. Thus, the apparent mass of the sprung mass can be reduced, and this can improve the ability of the tire to follow the contour of the road surface as well known in the art.

The present invention can be readily applied to an existing active suspension system without any substantial increase in the manufacturing cost particularly when the spring and damper means consists of the hydraulic actuator as controlled by the control unit so as to produce appropriate damping and spring forces which are substantially in proportion to a relative velocity and a relative displacement between the sprung mass and the unsprung mass, respectively.

To the end of improving the ride quality of the vehicle as well as the ability of the tire to maintain contact with the road surface, the actuator may further apply a damping force to the sprung mass which is substantially in proportion to an absolute velocity of the sprung mass. This allows the undesirable bouncing of the sprung mass or the vehicle body to be eliminated.

BRIEF DESCRIPTION OF THE DRAWINGS

Now the present invention is described in the following with reference to the appended drawings, in which:

FIGS. 5a and 5b are transmissibility vs frequency graphs of different suspension systems;

FIGS. 6a through 6c are step responses of different suspension systems; and

DETAILED DESCRIPTION OF THE PREFERRED EMBODIMENTS

Figure 1:
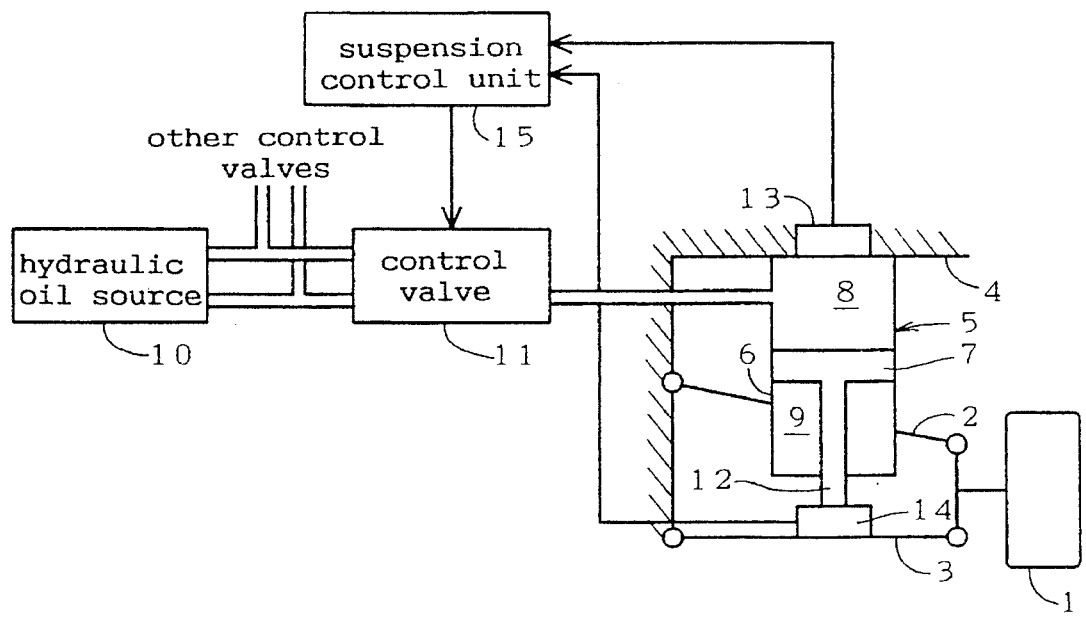
FIG. 1 is a schematic representation of an embodiment of the active suspension system according to the present invention.

FIG. 1 schematically illustrates an essential part of an active suspension system to which the present invention is applied. The wheel 1 is supported by upper and lower suspension arms 2 and 3 with respect to a vehicle body 4 so as to be moveable vertically. An hydraulic actuator 5 is interposed between the lower suspension arm 3 and the vehicle body 4.

The hydraulic actuator 5 consists of a hydraulic cylinder 6 and a piston 7 received therein so as to define a pressure chamber 8 and a back chamber 9 in the cylinder 6. The piston 7 can thus move linearly according to the pressure of hydraulic oil supplied to the pressure chamber 8 from a hydraulic oil source 10 via a control valve 11 in such a manner that the relative displacement between the wheel 1 and the vehicle body 4 can be changed.

G sensors or acceleration sensors 13 and 14 are mounted on a part of the cylinder 6 of the hydraulic actuator 5 where it is attached to the vehicle body 4 and a part of the piston rod 12 of the hydraulic actuator 5 where it is connected to the lower suspension arm 3, respectively, so that the vertical accelerations of these parts may be detected. Thus, it is made possible to individually detect the vertical accelerations of the sprung mass or the vehicle body 4 and the unsprung mass or the wheel 1, respectively. Output signals from these acceleration sensors 13 and 14 are supplied to a control unit 15 which in turn controls the operation of the control valve 11.

Figure 2:
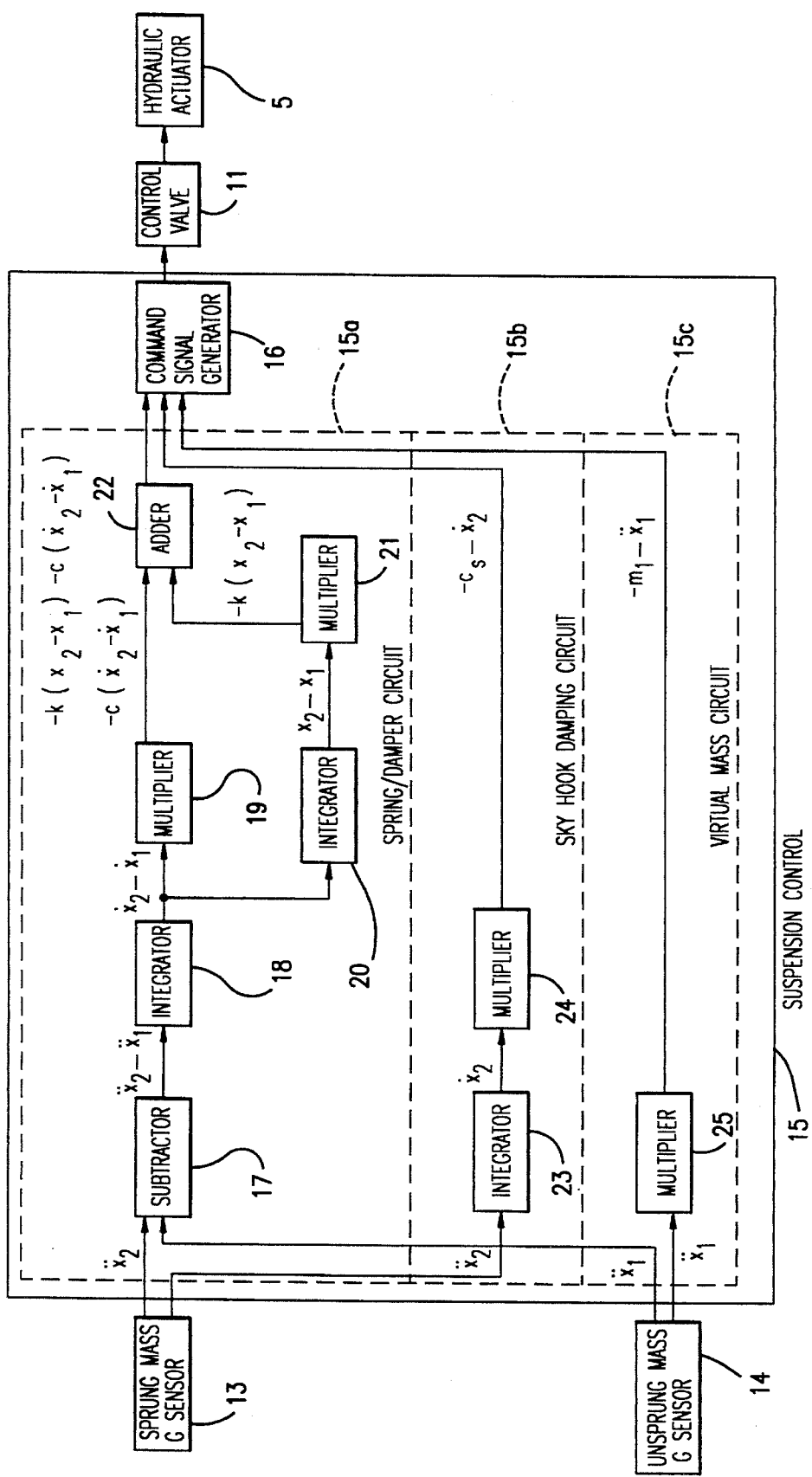
FIG. 2 is a block diagram of the control unit.

FIG. 2 is a block diagram of the control unit 15. This control unit 15 consists of a spring/damper circuit 15a for generating the forces corresponding to those generated by a conventional spring and damper system, a sky hook damper circuit 15b for generating a force for controlling the bouncing movement of the vehicle body 4, and a virtual mass circuit 15c for generating a force for cancelling the inertia of the unsprung mass. Outputs from these three circuits 15a through 15c are combined in a command signal generator 16 which supplies a control signal to the control valve 11.

The spring/damper circuit 15a comprises: a subtracter 17 for finding the relative acceleration between the sprung mass and the unsprung mass according to the signals ($d^2x_2/dt^2$ and $d^2x_1/dt^2$) obtained from the accelerations sensors 13 and 14 for the sprung mass and the unsprung mass respectively ($d^2x_2/dt^2 - d^2x_1/dt^2$); an integrator 18 for integrating the output from the subtracter 17 and finding the relative velocity ($dx_2/dt - dx_1/dt$); a multiplier 19 for multiplying a damping constant $c_1$ to the output from the integrator 18 ($-c_1(dx_2/dt - dx_1/dt)$); an integrator 20 for finding the relative displacement from the relative velocity ($x_2 - x_1$); a multiplier 21 for multiplying a spring constant $k_2$ to the output from the integrator 20 ($-k_2(x_2 - x_1)$); and an adder 22 for adding up the outputs obtained from the multipliers 19 and 21 ($-c_1(dx_2/dt - dx_1/dt) - k_2(x_2 - x_1)$). The overall effect is to produce a signal corresponding to the combined force of a spring force given as a force proportional to the relative displacement between the vehicle body 4 and the wheel 1, and a damping force proportional to the relative velocity between the vehicle body 4 and the wheel 1.

The sky hook damper circuit 15b comprises an integrator 23 for obtaining the velocity of the sprung mass ($dx_2/dt$) from the output signal of the sprung mass acceleration sensor 13 ($d^2x_2/dt^2$), and a multiplier 24 for multiplying a certain constant value $c_s$ to the velocity so that a virtual damping force which is given as a force proportional to the absolute velocity of the sprung mass ($-c_s(dx_2/dt)$) (a velocity of the sprung mass relative to a fixed point in the space) may be produced.

The virtual mass circuit 15c comprises a multiplier 25 which multiplies a certain constant $m_t$ corresponding to the unsprung mass to the output signal from the unsprung mass acceleration sensor 14 ($d^2x_1/dt^2$) and produces a signal ($-m_t(d^2x_1/dt^2)$) corresponding to a force for cancelling the inertia force of the unsprung mass.

These output signals are combined by an adder 16 for composing a final command signal which is then given to the control valve 11 for appropriately actuating the hydraulic actuator 5. A primary feature of the present invention is found in this virtual mass circuit 15c, and it can also be combined with a conventional spring/damper system instead of an active suspension system not employing any physical springs or dampers.

Figure 3A:
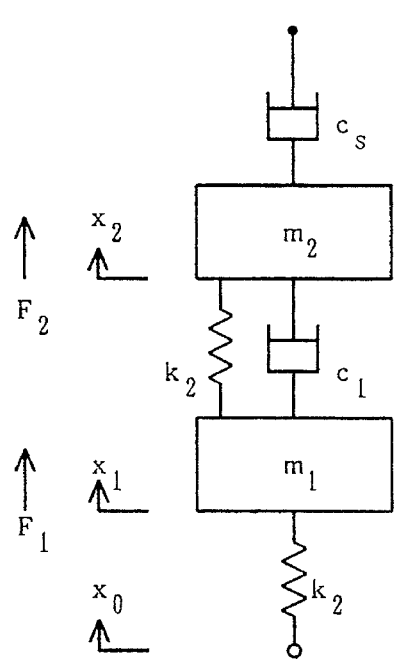
FIGS. 3a and 3b are mathematically equivalent models of the suspension system.
Figure 3B:
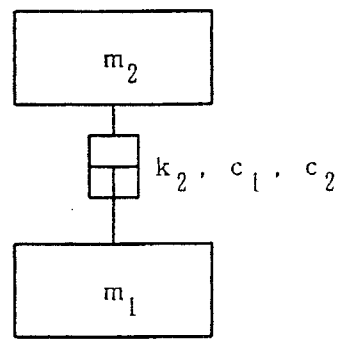
Figure 4:
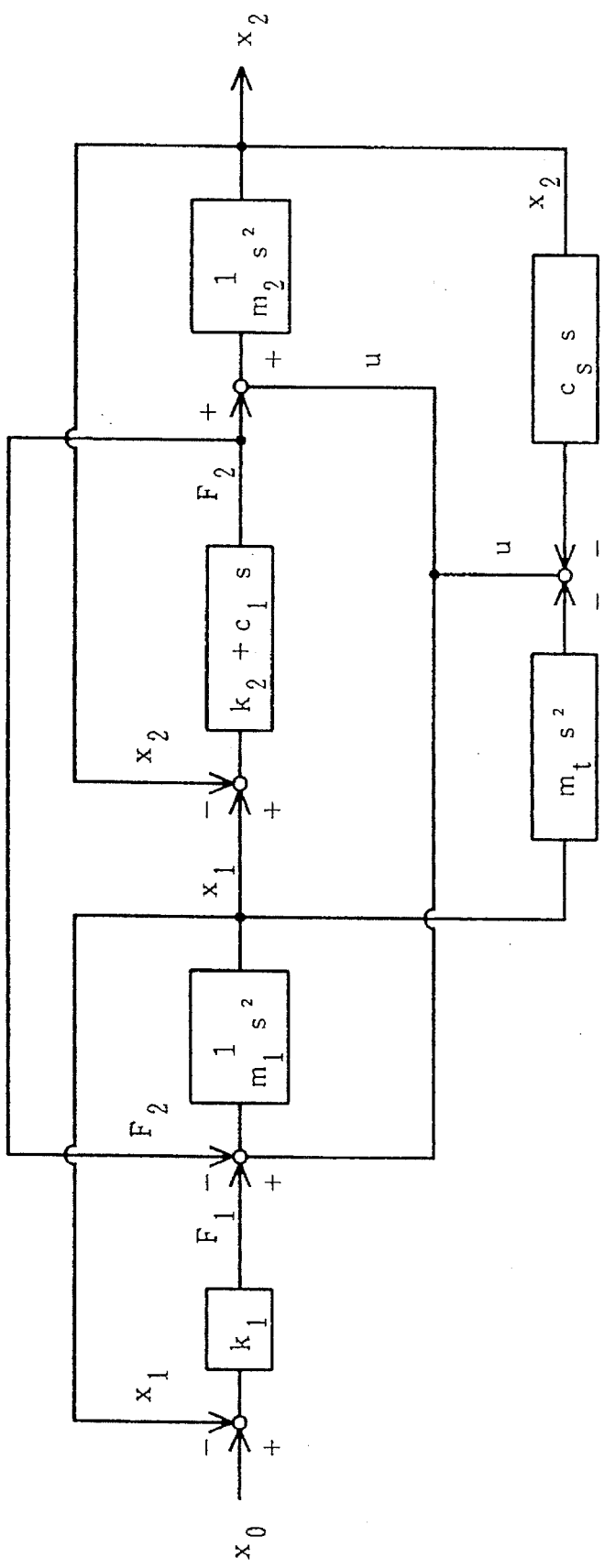
FIG. 4 is a block diagram of the feedback control system.

The suspension system of the present embodiment can be expressed by a mathematical model schematically illustrated in FIG. 3a. If the mass of the sprung mass is give by $m_2$, the mass of the unsprung mass by $m_1$, the spring constant of the tire by $k_1$, the spring constant between the vehicle body 4 and the tire 1 by $k_2$, the damping constant between the vehicle body 4 and the wheel 1 by $c_1$, the absolute position of the road surface by $x_0$, the absolute position of the gravitational center of the unsprung mass by $x_1$, the absolute position of the gravitational center of the sprung mass by $x_2$, the exciting force produced by the unsprung mass by $F_1$, and the exciting force produced by the sprung mass by $F_2$, then, the spring force ($k_2$) and the damping force ($c_1$, $c_s$) may be replaced by the output from the hydraulic actuator 5 as illustrated in FIG. 3b. In such a case, the feedback control system may be given by the equivalent circuit illustrated in FIG. 4.

Now the operation of the present embodiment is described in the following.

Figure 5A:
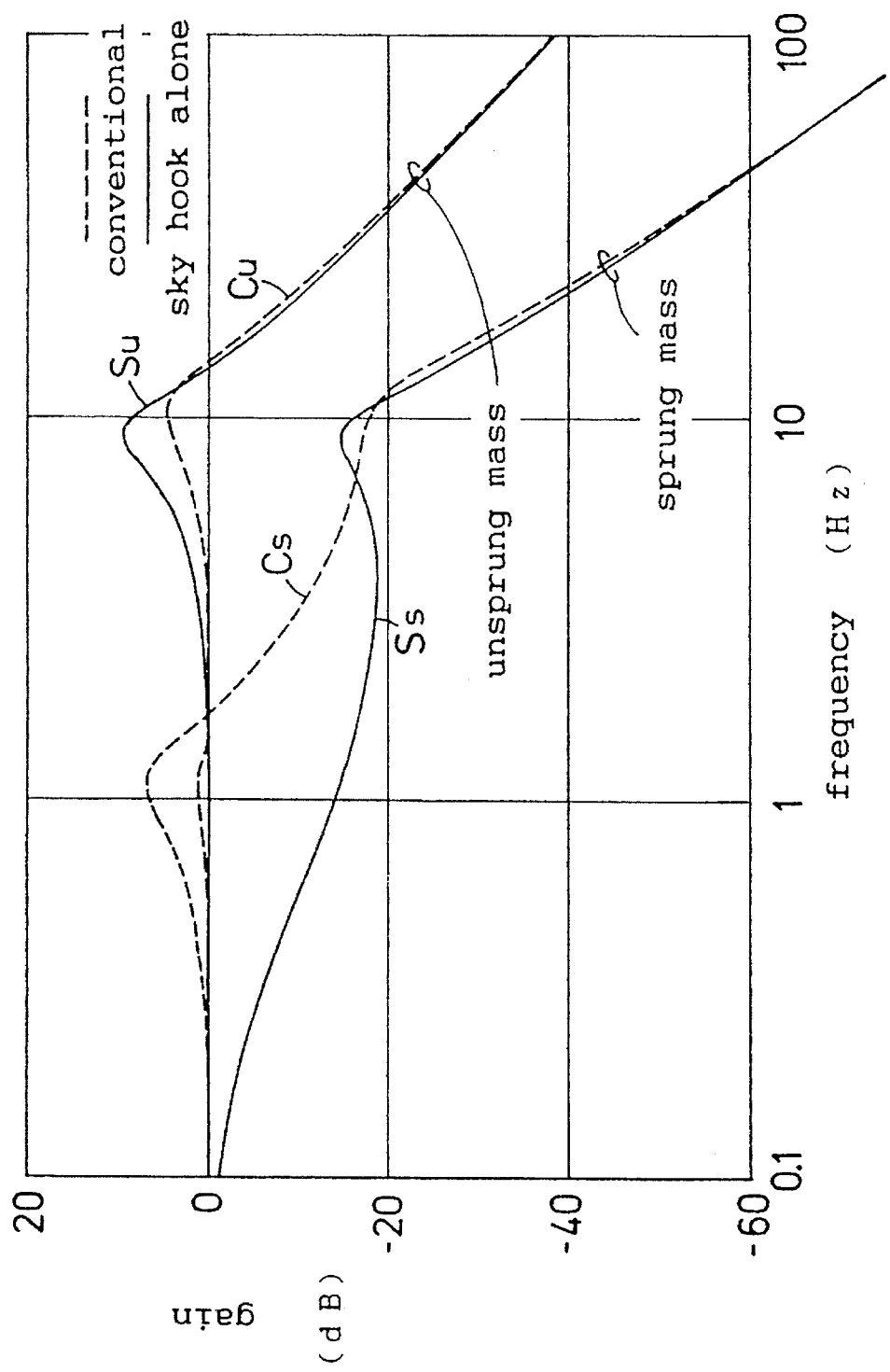

The vibration transmissibilities of the unsprung mass and the sprung mass with respect to an input from the road surface are shown for comparison in FIGS. 5a and 5b. As for the unsprung mass, referring to FIG. 5a, adding the sky hook damping (Su) to the conventional damping (Cu) makes little change near 1 Hz, but increases the peak value near 10 Hz. In other words, the sky hook damping tends to increase the bouncing of the wheel in the 10 Hz range. As for the sprung mass, the sky hook damping produces an improved damping effect in the 1 Hz range (Ss) as compared with the conventional damping property (Cs), but slightly increases the vibration transmissibility of the sprung mass in the 10 Hz range due to influences from the movement of the unsprung mass. No appreciable change from the conventional property can be seen in the frequency range beyond 10 Hz.

The properties of the systems incorporating the virtual mass control alone and both the virtual mass control and the sky hook damping are compared in FIG. 5b, and it can be seen that the behaviors of the sprung and the unsprung masses are not significantly different from those of the conventional system in the frequency range around 1 Hz when only the virtual mass control is incorporated (Mu, Ms), but that the gain of the displacement of the unsprung mass (Mu) is clearly closer to 0 dB in the frequency range above 10 Hz. It means that the virtual mass control makes a contribution in reducing the bouncing of the unsprung mass and improving the ability of the tire to maintain contact with the road surface.

When both the sky hook damping control and the virtual mass control are combined, favorable vibration control is possible over a wide frequency range covering both the 1 Hz and 10 Hz frequency ranges (Js). As for the unsprung mass, the tire is still able to maintain contact with the road surface in a highly improved manner (Ju) as compared with the conventional structure.

As can be seen from the step responses shown in FIGS. 6a through 6c, as far as the sprung mass is concerned, the virtual mass control alone cannot achieve any improvement over the conventional system C, but the use of the sky hook control alone (S) or the combination of the sky hook control and the virtual mass control (J) can improve the ride quality of the vehicle, however, with a slight decline in responsiveness.

As for the unsprung mass, the use of the sky hook control alone results in a greater tendency to overshoot although there is some improvement in responsiveness over the conventional system, but the use of the virtual mass control alone results in a highly responsive property combined with a favorable damping control (M).

Figure 7:
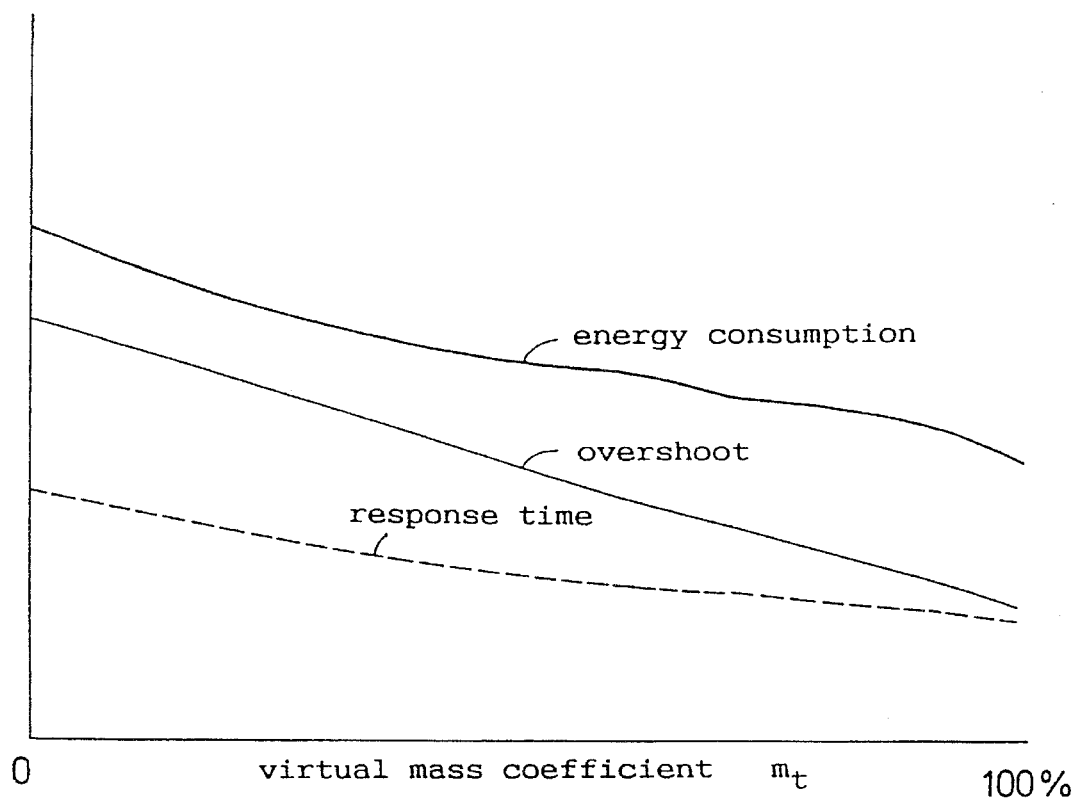
FIG. 7 is a graph showing the relationship between the energy consumption, overshoot and response time for different values of the virtual unsprung mass for a given step response.

The coefficient $m_t$ in the virtual mass control can be freely determined from the range given by $m_1$ (unsprung mass)$\geq$virtual mass $m_t>0$. Thus, the output $-m_t\ddot{x}_1$ of the multiplier 25 in the virtual mass circuit 15c is controlled according to a target value equal to the product of the vertical acceleration $\ddot{x}_1$ of the unsprung mass and a value equal to or less than the mass of the unsprung mass. Since the ride tends to be harder as the contact capability is increased, the magnitude of the virtual mass should be determined according to the particular requirement. As indicated by the graph of FIG. 7, it was found that using relatively large values for the virtual mass mt was beneficial not only in improving the road contact capability but also improving the fuel economy through reduction in the consumption of energy by the suspension actuator.

Thus, adding only the sky hook control to an active suspension system using a hydraulic suspension system is effective in controlling the vibration of the sprung mass, but tends to increase the vibration transmissibility of the unsprung mass in the resonance frequency range thereof, thereby impairing the capability of the tire to maintain contact with the road surface. However, by combining the virtual mass control with the sky hook control, it is possible to reduce the apparent magnitude of the unsprung mass. Therefore, it is possible to bring the gain of the transmissibility in the resonance frequency range of the unsprung mass to substantially zero and improve the capability of the tire to maintain contact with the road surface without compromising the ability to control the vibration of the sprung mass. An improvement in the capability of the tire to maintain contact with the road surface reduces the unnecessary movement of the unsprung mass, and the effective work of the hydraulic actuator may be reduced with the result that the burden on the hydraulic pump can be reduced.

Although the present invention has been described in terms of a preferred embodiment thereof, it is obvious to a person skilled in the art that various alterations and modifications are possible without departing from the scope of the present invention which is set forth in the appended claims. For instance, the virtual mass control can be applied not only to a hydraulic fully active suspension system but also to a conventional spring and damper suspension system.

What we claim is:

1. A method for controlling a vehicle suspension system including a hydraulic actuator between a sprung mass consisting substantially of a vehicle body and an unsprung mass consisting substantially of a wheel and parts associated therewith, comprising the steps of:

detecting a vertical acceleration of said unsprung mass;

determining an inertia force of said unsprung mass using the detected vertical acceleration of said unsprung mass:

determining a control signal for said actuator such that the actuator will apply a force to said wheel which is substantially in proportion to and opposite in phase to said inertia force of said unsprung mass; and controlling said actuator based on said control signal to apply said force to said wheel for substantially cancelling said inertia force of the unsprung mass.

2. A method according to claim 1, wherein:

aid force substantially in proportion to and opposite in phase to an inertia force of said unsprung mass is determined according to a target value equal to a product of said acceleration of said unsprung mass and a value equal to or less than the mass of said unsprung mass.

3. A method according to claim 1, wherein said actuator is controlled so as to produce further appropriate damping and spring forces which are substantially in proportion to a relative velocity and a relative displacement between said sprung mass and said unsprung mass, respectively.

4. A method according to claim 3, wherein the output of said actuator is determined so as to further apply a damping force to said sprung mass which is substantially in proportion to an absolute velocity of said sprung mass.

5. A method according to claim 1, wherein:

said force applied to said unsprung mass is substantially equal in magnitude and opposite in phase to an inertia force of said unsprung mass.

* * * * *